(12) United States Patent
Choi et al.

(10) Patent No.: US 7,609,323 B2
(45) Date of Patent: Oct. 27, 2009

(54) CAMERA MODULE FOR MOBILE COMMUNICATION DEVICE, MOBILE COMMUNICATION DEVICE USING THE SAME, AND METHOD FOR CONTROLLING THE SAME

(75) Inventors: Tae Kyu Choi, Anyang-si (KR); Wan Joong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 734 days.

(21) Appl. No.: 11/104,405

(22) Filed: Apr. 13, 2005

(65) Prior Publication Data

US 2006/0007351 A1    Jan. 12, 2006

(30) Foreign Application Priority Data

Jul. 12, 2004    (KR) .................. 10-2004-0053913

(51) Int. Cl.
*H04N 5/225*    (2006.01)
*H04N 5/222*    (2006.01)

(52) U.S. Cl. ................. 348/374; 348/333.11

(58) Field of Classification Search ................. 348/374, 348/340; 257/433, 434; 250/239
See application file for complete search history.

(56) References Cited

U.S. PATENT DOCUMENTS

| 5,241,422 | A | * | 8/1993 | Shimada et al. | ............. | 359/694 |
| 2003/0137595 | A1 | * | 7/2003 | Takachi | ...................... | 348/340 |
| 2004/0001158 | A1 | * | 1/2004 | Aoki | ......................... | 348/345 |

FOREIGN PATENT DOCUMENTS

| KR | 10-2004-0005410 A | 1/2004 |
| KR | 10-2004-0035466 A | 4/2004 |

* cited by examiner

*Primary Examiner*—Lin Ye
*Assistant Examiner*—Joel Fosselman
(74) *Attorney, Agent, or Firm*—Birch, Stewart, Kolasch & Birch, LLP

(57) ABSTRACT

A camera module for a mobile communication terminal enabling to control a focal point, a mobile communication terminal using the same, and a method of controlling the same are provided. The camera module includes a camera housing, a lens provided in the camera housing, an elastic member for elastically supporting the lens in the camera housing, and a lens transformer including a first member supported by the camera housing and a second member supporting the lens, the lens transformer moving the lens together with the second member by generating an attractive force or repulsive force when power is supplied.

31 Claims, 8 Drawing Sheets

CAMERA MODULE FOR MOBILE COMMUNICATION DEVICE, MOBILE COMMUNICATION DEVICE USING THE SAME, AND METHOD FOR CONTROLLING THE SAME

CROSS-REFERENCE TO RELATED APPLICATIONS

This application claims the priority benefit of Korean Patent Application No. 10-2004-053913, filed on Jul. 12, 2004, which is hereby incorporated by reference as if fully set forth herein.

BACKGROUND OF THE INVENTION

1. Field of the Invention

The present invention relates to a mobile communication device, and more particularly, to a camera module for a mobile communication device, a mobile communication device using the camera module, and a method for controlling the camera module and/or the mobile communication device.

2. Discussion of the Related Art

In general, with the development of a mobile communication device such as a cellular phone and PDA, such device can deliver simple voice information and also information such as text information, picture information, and game to a user. In addition, a camera module is carried in the mobile communication device such that the user can directly produce picture information such as an image.

Meanwhile, the mobile communication device such as a cellular phone and PDA is manufactured in a compact size for providing portability. Accordingly, the camera module carried in the mobile communication device needs to have a simple structure to provide a compact size for the communication device. However, the size of camera modules used in a conventional camera or a digital camera for controlling a location of a lens by using a motor is too large to carry in the mobile communication device requiring a compact size.

To address this concern, a compact camera module for the mobile communication device having a simple structure wherein the focal point is not changed or is changed only manually, has been proposed. In the former case, because the focal point is fixed at a predetermined distance, however, there is a problem that the camera is out of focus during a short-distance filming or a long-distance filming.

On the other hand, in the latter case, because the location of the lens is mechanically moved by using a manual switch, it is not only inconvenient to use but also is difficult to focus exactly.

SUMMARY OF THE INVENTION

Accordingly, the present invention is directed to a camera module for a mobile communication device, a mobile communication device using the same, and a method for controlling the same that substantially obviate one or more problems due to limitations and disadvantages of the related art.

An object of the present invention is to provide a camera module for a mobile communication terminal, a mobile communication terminal using the same, and a method for controlling the same, the camera module being loaded and used in a compact mobile communication terminal, and having a simple structure with a function of controlling a focal point.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a camera module for a mobile communication device according to an embodiment of the present invention includes a camera housing mounted at a mobile communication terminal, a lens provided in the camera housing, an elastic member for elastically hanging the lens in the camera housing, and a lens transformer having a first member supported by the camera housing and a second member mounted to be geared with the lens.

In another aspect of the present invention, a mobile communication terminal includes a terminal housing having a signal input/output system, a display, a memory, a controller and a mobile communication signal processor; a battery pack detachably mounted at the terminal housing; and the camera module for the mobile communication terminal.

According to a feature of the present invention, the camera housing includes a first housing over which the elastic member is hanged, and a second housing supporting the first member and being separated from the first housing. In this case, the second housing includes a ridge projected along an inner circumferential surface for supporting a lower end of the first member.

According to another feature of the present invention, the camera module further includes an image processor provided at the camera housing for receiving and processing lights passed through the lens. In this case, the image processor, for example, includes a camera sensor provided in the camera housing for receiving lights passed through the lens and converting them into image data, and a digital signal processor coupled with the camera housing for converting the image data received from the camera sensor into a digital signal.

According to another feature of the present invention, the camera housing includes a first space for receiving the first member, a second space provided under the first space for receiving at least a part of the image processor, and a ridge projected along the inner circumferential surface of the camera housing for dividing the space into the first space and the second space and supporting a lower end of the first member.

According to another feature of the present invention, the elastic member includes an outer circumferential portion coupled with the inner circumferential surface of the camera housing, an inner circumferential portion coupled with at least one of the lens and the second member, and an elastic part provided between the outer circumferential portion and the inner circumferential portion. In this case, the elastic part is formed in a flat form, or folded in the radius direction of the elastic member.

According to another feature of the present invention, the second member of the lens transformer is formed in a ring form and the lens is fixed on the inner circumferential surface of the second member.

According to another feature of the present invention, one of the first member and the second member of the lens transformer includes a magnetic body or a permanent magnet, and the other one includes an electromagnet. However, the first member and the second member may include the electromagnet respectively.

According to another feature of the present invention, the first member and the second member of the lens transformer different diameters. At least a part of the first member is inserted into the second member, or at least a part of the second member is inserted into the first member when an attractive force acts between the first member and the second member.

Yet, in another aspect of the present invention, a method of controlling the camera module for a mobile communication terminal includes the steps of (a) supplying an initial voltage to a lens transformer for moving the lens by generating an attractive force or repulsive force when power is supplied, (b) determining whether a focal point of the subject projected on the camera sensor is wrong, (c) determining the focal point by changing a voltage strength supplied to the lens transformer if the focal is wrong, and (d) maintaining the supplied voltage if the focal point is right.

According to another feature of the present invention, the step (c) includes the steps of (c1) supplying a voltage higher (or lower) than the previously supplied voltage and determining the focal point if the focal point is wrong, (c2) supplying a voltage higher (or lower) than the previously supplied voltage and determining the focal point if the focal point is better, and (c3) supplying a voltage lower (or higher) than the previously supplied voltage and determining the condition of the focal point if the focal point is worse.

According to another feature of the present invention, power is supplied to the lens transformer only in a half shutter mode obtainable when the camera shutter is pressed halfway down.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
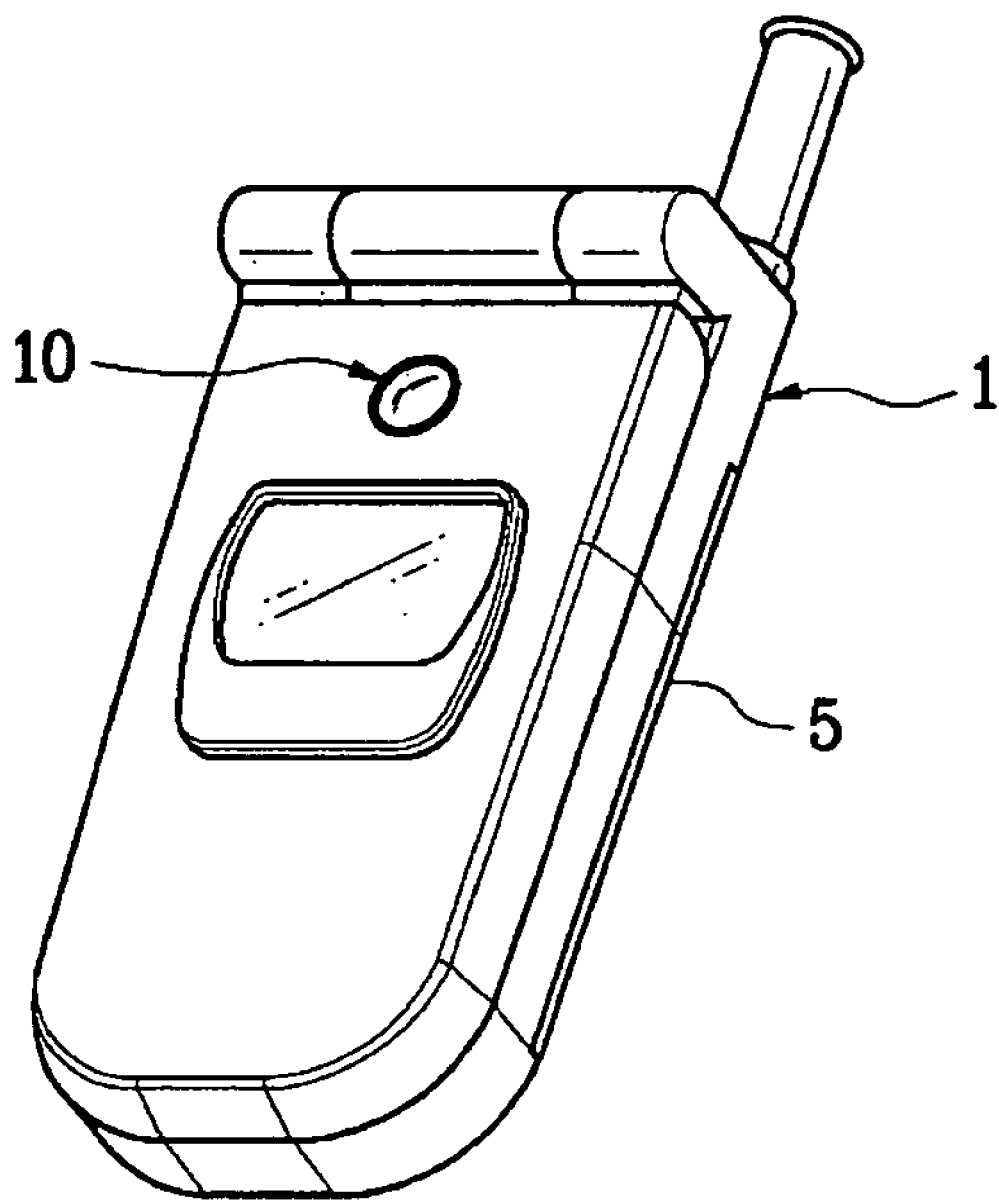
FIG. 1 illustrates a perspective view showing an embodiment of a camera for a mobile communication device having a camera module in accordance with the present invention.

Referring to FIG. 1, the mobile communication device in accordance with the present invention includes a terminal housing 1, a battery pack 5, and a camera module 10 in accordance with the present invention. All the components of the mobile communication device are operatively coupled.

In this case, the battery pack 5 is detachably provided at the terminal housing 1 and the camera module 10 is provided at the terminal housing 1.

As a reference, although an example of the terminal housing 1 having a structure of a folder type is illustrated in FIG. 1, the invention is not limited to this structure and encompasses other structures and/or configurations. For example, the terminal housing 1 may be formed in a slide type, a bar type, or a flip type structure. The folder type means a structure wherein two terminal housings having parts therein are rotatable around a hinge so as to be opened and closed. The slide type is a structure wherein the two terminal housings can slide from each other so as to be opened. The bar type is a structure including a terminal housing having parts therein and the flip type is a structure wherein a cover can be flipped up/down so as to be opened and closed.

Figure 2:
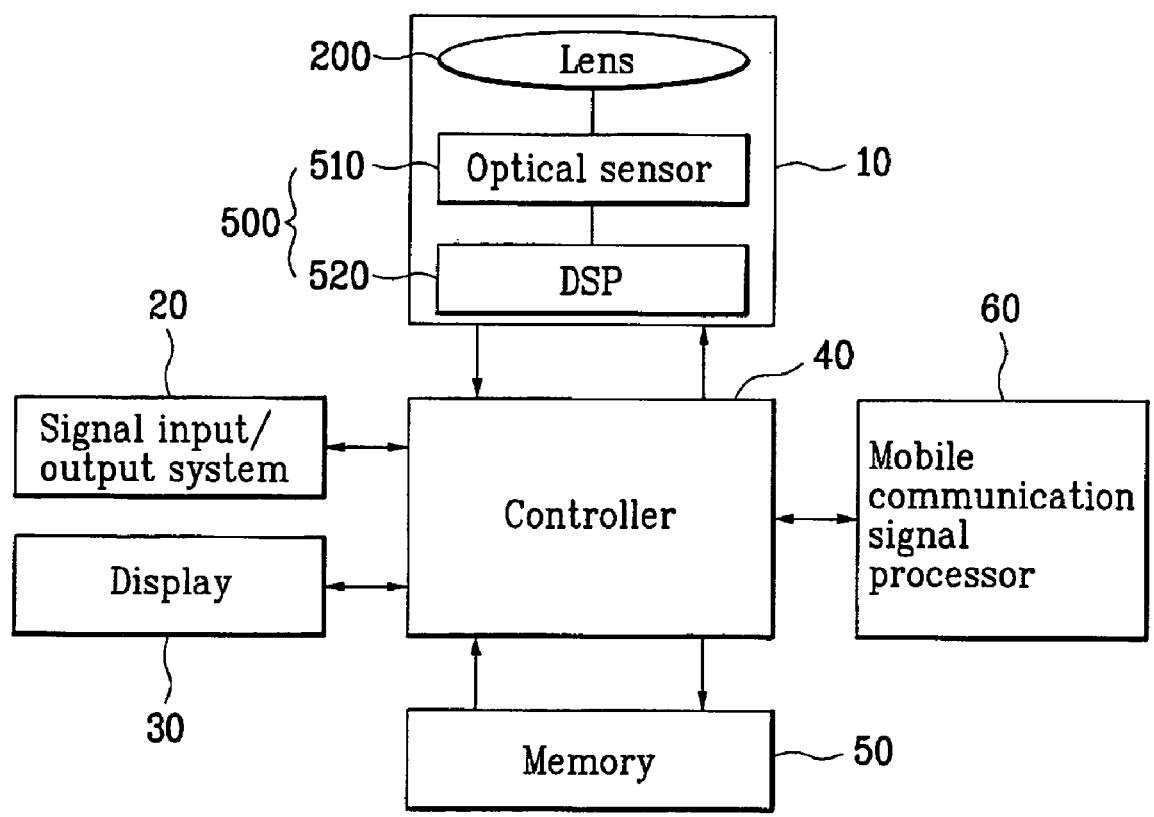
FIG. 2 illustrates a block diagram showing a simple structure of the mobile communication device of FIG. 1.

Referring to FIG. 2, the terminal housing 1 includes not only the camera module 10, but also has a signal input/output system 20, a display 30, a controller 40, a memory 50, and a mobile communication signal processor 60. The camera module 10 includes a lens 200 and an image processor 500.

In this case, the signal input/output system 20 includes a speaker, a microphone, and various keys and buttons. The mobile communication signal processor 60 includes a transmitting signal processor for processing and transmitting information inputted through the signal input/output system 20 and stored in the memory 50, and a receiving signal processor for receiving and processing an electric wave from outside.

The signal input/output system 20, the display 30, the controller 40, the memory 50, and the mobile communication signal processor 60 are the same as those provided in a conventional mobile communication device, and therefore, a description thereof will be omitted.

The camera module 10 provided at the terminal housing 1 may be provided on a front surface of the terminal housing 1 as illustrated in FIG. 1. However, it is not limited to this, but the mounting location of the camera module may vary according to the kind and design of the terminal housing 1. For example, the camera module 10 may be provided on a rear surface of the terminal housing 1, on a side or on an upper surface thereof, or around the hinge.

Figure 3:
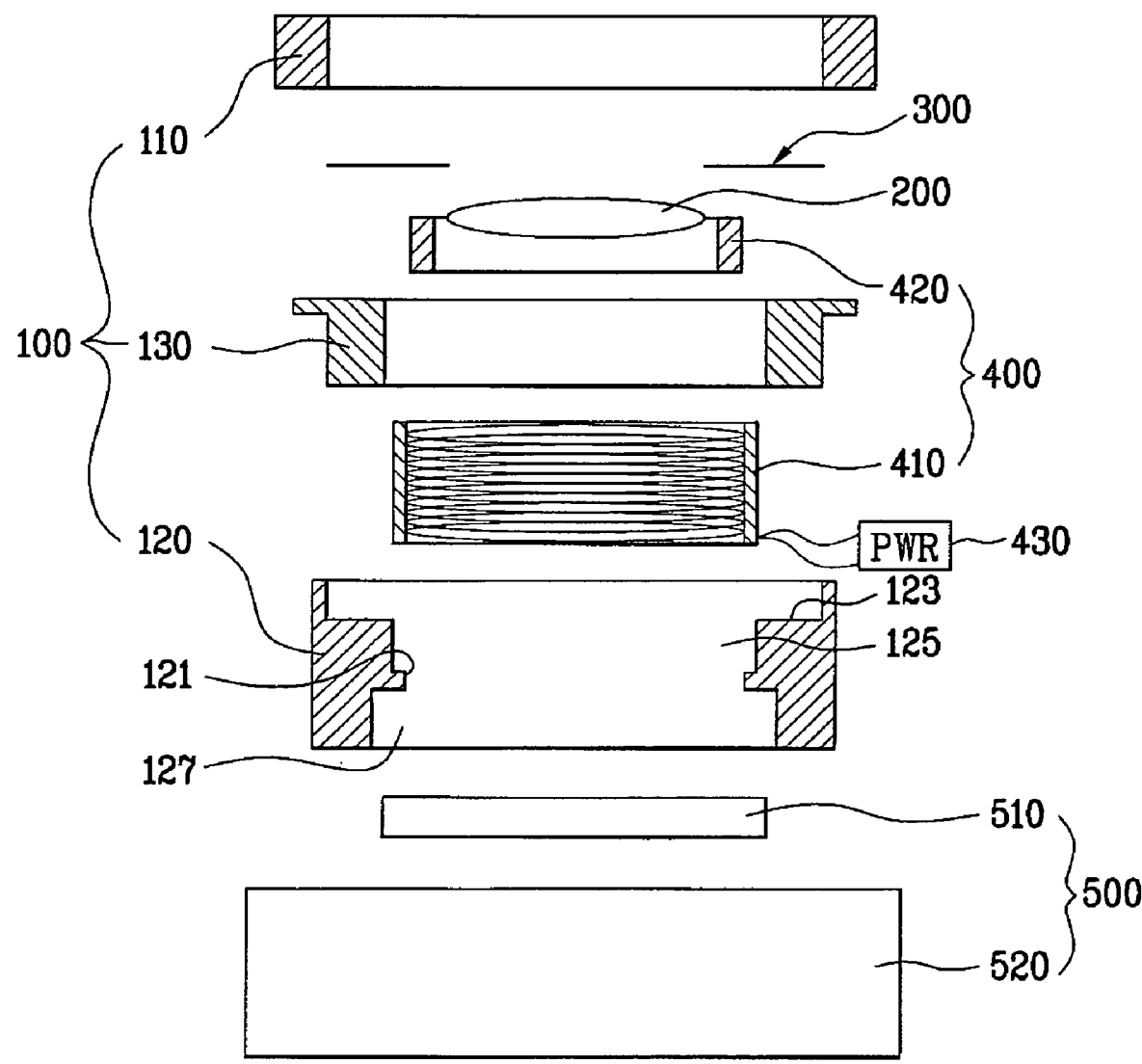
FIG. 3 illustrates a cross-sectional view showing an embodiment of a camera module 10 of FIG. 2 as unassembled according to the present invention.

In FIG. 3, the structure of the camera module 10 provided at the terminal housing 1 in accordance with the present invention is illustrated, and hereinafter, the detailed description of the camera module 10 will be described referring to the same.

Referring to FIG. 3, a camera housing 100 is provided for the camera module 10. The camera module 10 includes a plurality of pieces capable of assembling and detaching.

The assembled camera housing 100 is formed generally in a cylinder form with an opened top end and an opened bottom end, and houses parts such as the lens 200, a spring 300, and a lens transformer 400 having a first member 410 and a second member 420.

Figure 6A:
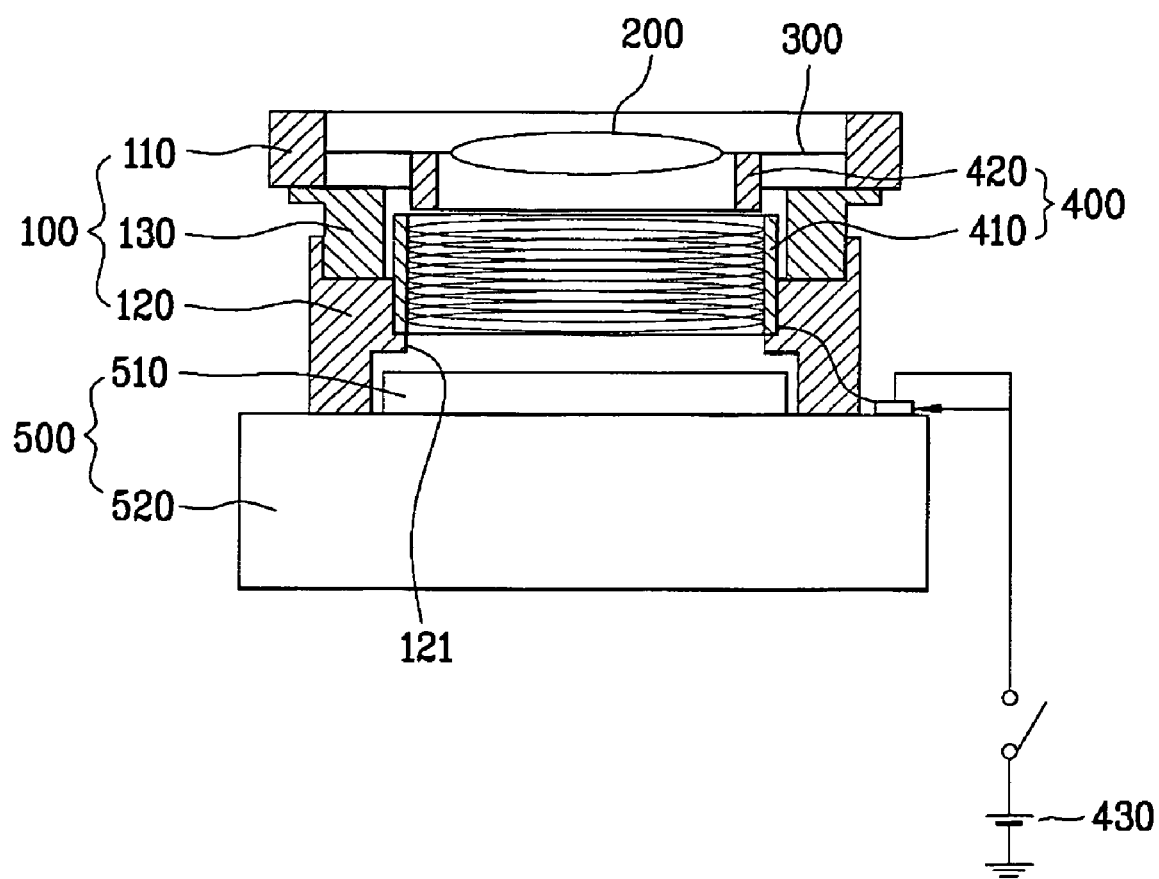
FIG. 6A illustrates a cross-sectional view showing an initial state that an electric power is not supplied to a lens transformer in the camera module of FIG. 3.

In FIG. 3, an example of the camera housing 100 including three pieces is illustrated. An example of the housing 100 as assembled is also shown in FIG. 6A. Referring to FIGS. 3 and 6A, the camera housing 100 includes a first housing 110, a second housing 120 and a third housing 130. The first housing 110 includes an upper part of the camera housing 100, and formed, for example, in a ring form. On an inner circumferential surface of the first housing 110, an outer circumferential portion 330 (FIGS. 4A and 4B) of the spring 300 is supported. For this, although not illustrated, a groove is provided for receiving the outer circumferential portion 330 of the spring 300 along the inner circumferential surface of the fist housing 110.

The second housing 120 is configured at a lower part of the camera housing 100, and a part of the lens transformer 400, more particularly, the first member 410 is supported on the inner surface of the second housing 120. For this, in the center of the inner surface of the second housing 120, a ridge 121 protrudes along the inner surface of the second housing 120.

Therefore, the inner space of the second housing 120 is divided into a first space 125 at an upper part thereof and a second space 127 at a lower part thereof by means of the ridge 121. In the first space 125, a part of the lens transformer 400, more particularly, the first member 410 is received. In the second space 127, a part of the image processor 500, more particularly, a camera sensor 510 is received.

The third housing 130 is provided between the first housing 110 and the second housing 120. A top portion of the second housing 120 supports a lower end portion of the third housing 130. For this, a jaw 123 for catching and supporting the third housing 130 is provided at the upper part of the second housing 120.

The top portion of the third housing 130 supports the bottom of the first housing 110. In one example, the outer circumferential portion 330 of the spring 300 may not be supported by the inner surface of the first housing 110, but may be inserted between the third housing 130 and the first housing 110, and fixed thereon. The first housing 110, the second housing 120, and the third housing 130 are assembled each other using a screw coupling method or other suitable method.

Although an example of the camera housing 100 including the three housing pieces has been described above, the invention is not limited to this, but the camera housing 100 may include any number of pieces as needed. For instance, the camera housing 100 can have two pieces. In this case, the third housing 130 is not provided, or is incorporated integrally to one of the first housing 110 and the second housing 120.

The lens 200 is provided in the camera housing 100. The lens 200 is disposed at the upper part in the camera housing 100, and moves along a length direction of the camera housing 100 by the lens transformer 400.

Figure 4A:
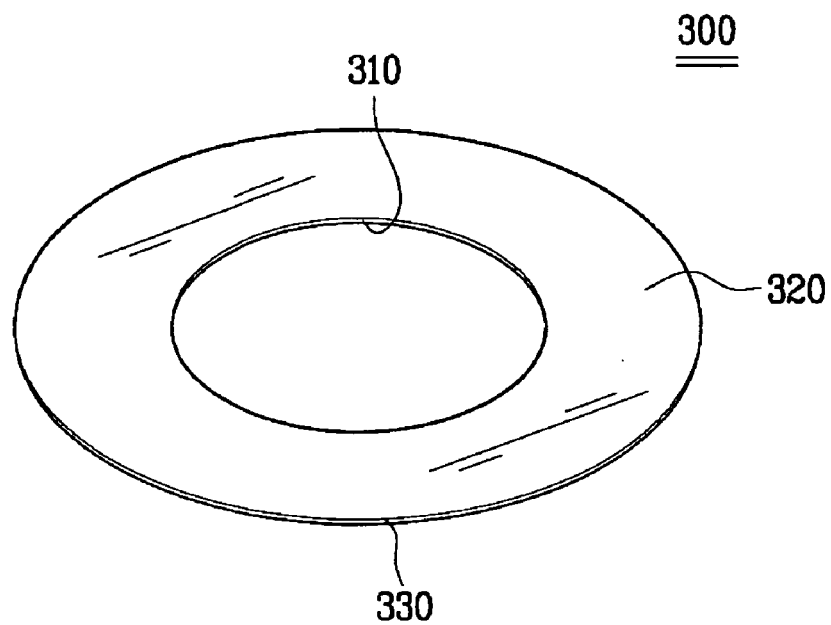
FIG. 4A illustrates a perspective view showing one example of a spring 300 of FIG. 3 according to the present invention.
Figure 4B:
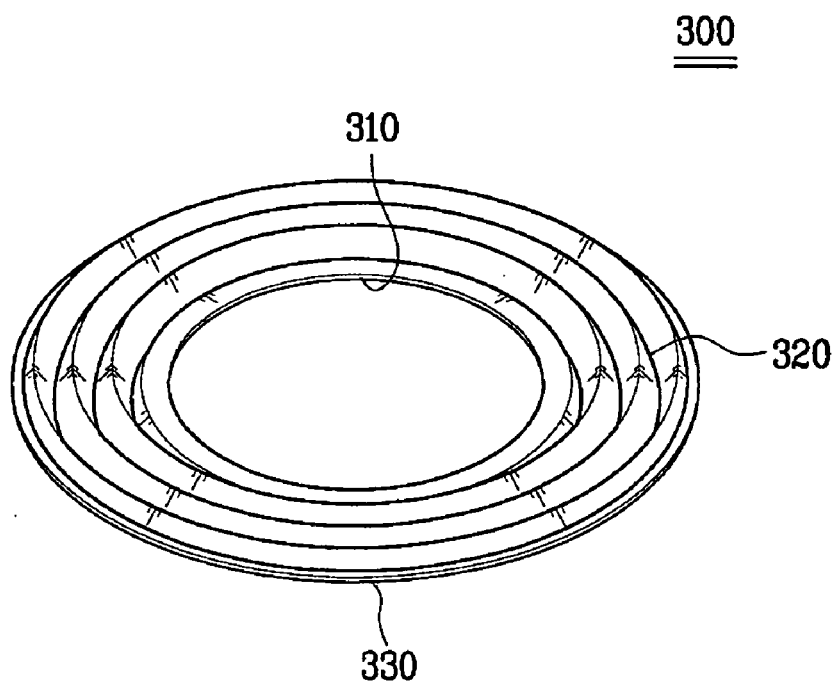
FIG. 4B illustrates a perspective view showing another example of the spring 300 of FIG. 3 according to the present invention.

The lens 200 is elastically hanged in the camera housing 100 by the spring 300. FIGS. 4A and 4B show two different examples of the spring 300. For this, the lens 200 is coupled with the inner circumferential portion 310 of the spring 300, and the outer circumferential portion 330 of the spring 300 is coupled with the inner surface of the camera housing 100, more particularly, the first housing 110. An elastic member 320 (spring 300) is provided between the inner circumferential portion 310 and the outer circumferential portion 330 so as to be changed elastically.

In this case, the elastic member 320 is formed in a flat form as illustrated in FIG. 4A, or in a folded form along a radius direction of the spring 300 as illustrated in FIG. 4B. The elastic member 320 accumulates elastic energy when the inner circumferential portion 310 of the spring 300 is ascended or descended from the outer circumferential portion of the spring 300 along with the lens 200.

The elastic member 320 moves its inner circumferential portion 310 to the same height as its outer circumferential portion 330 by using the elastic energy accumulated at the elastic member 320, thereby automatically restoring the lens 200 to its initial location/position.

Therefore, when the lens 200 is supported by the spring 300, the lens 200 is stably maintained at its initial location and restored to the initial location after moving, without needing separate energy supplied thereto.

Described above is an example of the lens 200 directly coupled with the inner circumferential portion 310 of the spring 300. However, without being limited to this, the lens 200 may be indirectly coupled with the spring 300 and an example of which will be described below while describing the second member 420 of the lens transformer 400.

The lens 200 mounted as above mentioned is moved in an up and down direction, i.e., the length direction of the camera housing 100 by the lens transformer 400. The lens transformer 400 moves the lens 200 by an electromagnet, and the principle of which is as follows.

For example, the first member 410 of the lens transformer 400 is formed in a cylindrical form and mounted on an inner surface of the camera housing 100 so as to be supported thereon. In more detail, the lower part of the first member 410 is received into the first space 125 of the second housing 120 and the lower end thereof is supported and fixed by the upper surface of the ridge 121. In this instance, the first member 410 is inserted into the inner circumferential surface of the second housing 120 and fixed thereon.

The second member 420 of the lens transformer 400 is formed, for example, in a ring form, and mounted to engage with the lens 200. For that reason, the lens 200 is provided in the second member 420 as illustrated in FIG. 3, and the second member 420 is coupled with the spring 300. In this case, the inner circumferential portion 310 of the spring 300 is fixed not only to the second member 420 but also to the lens 200.

At least one of the first member 410 and the second member 420 includes an electromagnet. In this instance, a simple description of the electromagnet is provided as follows. The electromagnet includes a core, and a coil wound on the core. When power is supplied to the coil, a magnetic field is formed around the coil and the core is magnetized. Because the magnetized core performs a role of a magnet, the magnetized core generates an attractive force or repulsive force toward the electromagnet, a permanent magnet, or a magnetic body.

Therefore, when one of the first member 410 and the second member 420 includes an electromagnet (source) and the other one includes an electromagnet, a permanent magnet, or a magnetic body, a distance between the first member 410 and the second member 420 is controlled by supplying power to the source electromagnet and generating a repulsive force or attractive force between the first member 410 and the second member 420. As a reference, FIG. 3 illustrates an example showing that the first member 410 includes an electromagnet and the second member 420 includes a permanent magnet or a magnetic body.

Figure 5:
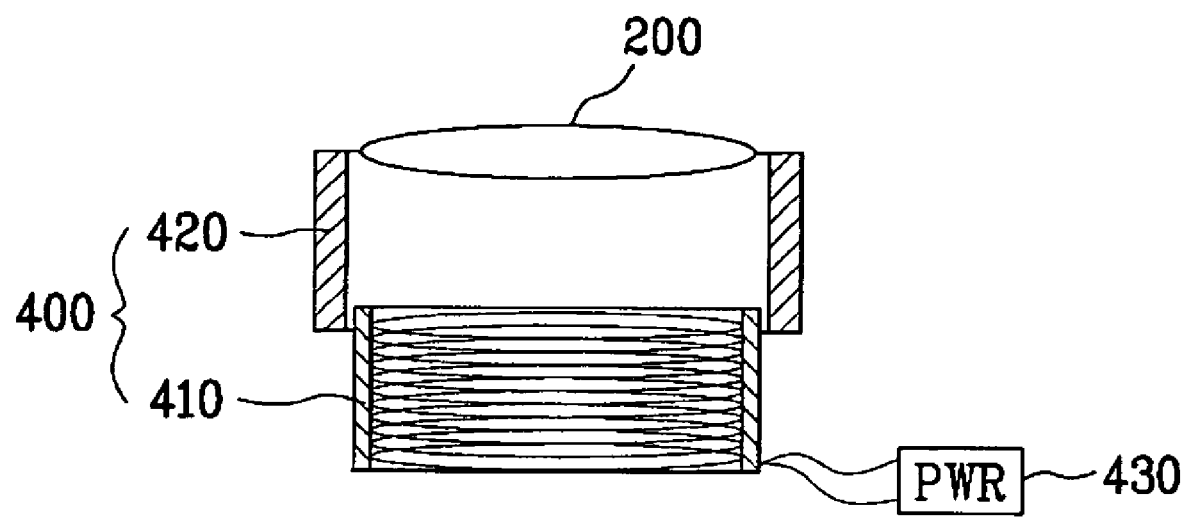
FIG. 5 illustrates a cross-sectional view showing another example of a lens transformer at a camera module in accordance with the present invention.

It is desirable that the first member 410 and the second member 420 of the lens transformer 400 have different diameters as illustrated in FIGS. 3 and 5. When power is supplied to the lens transformer 400, and the attractive force or the repulsive force is generated between the first member 410 and the second member 420, one of the first member 410 and the second member 420 may be inserted into the other one. As a reference, FIG. 3 illustrates an example showing that a part or whole part of the second member 420 is inserted into the first member 410. FIG. 5 illustrates an example showing that a part or whole part of the first member 410 is inserted into the second member 420 when the power is supplied to the lens transformer 400.

With the above-mentioned structure, the distance between the first member 410 and the second member 420 is shortened. Accordingly, the camera module 10 is made to be compact because the length of the camera housing 100 is shortened.

Meanwhile, in general, in the mobile communication device, light, i.e., an image passed through the lens 200 is stored not in a film form, but in a data form, and then reproduced. The image processor 500 (FIGS. 2 and 3) is provided at the mobile communication device for receiving and processing the light passed through the lens 200. In this case, the image processor 500 includes a camera sensor 510 and a digital signal processor 520, and the description of which is provided as follows.

The camera sensor 510 is used for storing a picture or a video, and includes a CMOS sensor or a CCD sensor for modulating the image into an electric signal. The camera sensor 510 converts the light, i.e., the image passed through the lens 200 into analog data and determines a physical magnification of the image. The digital signal processor 520 (DSP) converts the analog data received from the camera sensor 510 into digital data.

The digital video data converted at the digital signal processor 520 is transmitted to a video/image processor (not shown) provided at the main board of the mobile communication terminal, and is converted at the video/image processor into appropriate data capable of being reproduced through a liquid crystal display device (or other display device) provided at the mobile communication device, and then reproduced through the liquid crystal display.

The image processor 500 having the structure above-mentioned may be manufactured separate from the camera module 10 and mounted at the mobile communication device such as a cellular phone. The camera module 10 may be mounted at the mobile communication device so as to be coupled with the image processor 500.

In this instance, the camera housing 100 of the camera module 10 needs to be exactly coupled with the image processor 500 provided at the mobile communication device, because the focal point of the image is determined by the distance between the camera sensor 510 of the image processor 500 and the lens 200 and an exact image is not reproduced when the camera sensor 510 and the camera housing 100 are coupled in an inaccurate or misaligned manner.

Figure 6B:
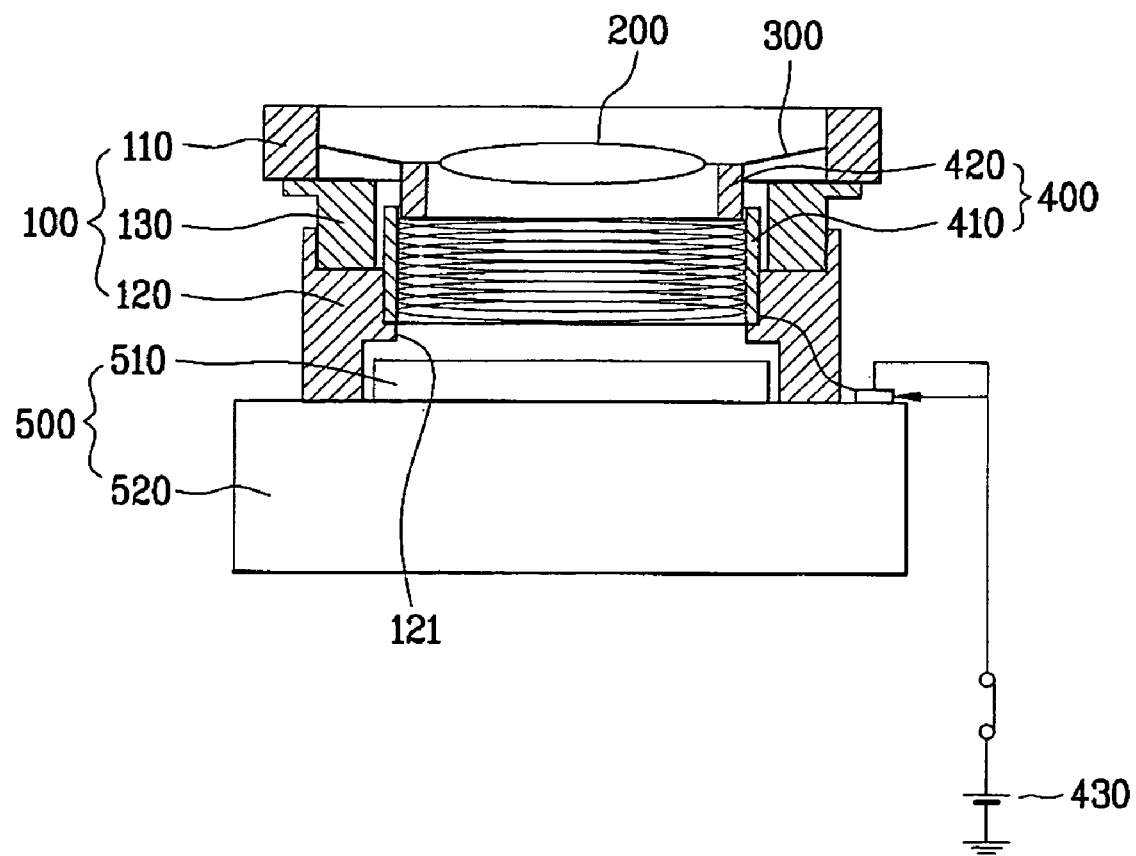
FIG. 6B illustrates a cross-sectional view showing a state that an electric power is supplied to the lens transformer in the camera module of FIG. 3, for automatically controlling a focal point in the camera module.

Therefore, for making the assembly easy and exact, it is desirable that the image processor 500 be included in the camera module 10 as in the present invention, as illustrated in FIGS. 6A and 6B. In other words, the image processor including an assembly of the camera sensor 510 and the digital signal processor 520 is coupled with the camera housing 100 firstly, and then the camera module 10 is mounted at the mobile communication device. For example, the camera sensor 510 is provided inside of the camera housing 100, more particularly, in the second space 127 provided in the second housing 120, and the digital signal processor 520 is coupled with a lower part of the second housing 120.

With the above-mentioned structure, the camera housing 100 of the camera module 10 in accordance with the present invention is mounted at the mobile communication terminal, and then a wire coupled with the image processor 500 is coupled with the main board (not shown) of the mobile communication terminal. Therefore, the camera module 10 and the mobile communication terminal are easily and exactly assembled.

After assembling the mobile communication device as mentioned above, the camera module 10 provided at the mobile communication terminal in accordance with the present invention controls the focal point by driving the lens transformer 400 under control of the controller 40.

For this, the controller 40 provides a method for controlling the camera module in the mobile communication terminal, the method including the steps of (a) supplying an initial DC bias to the lens transformer 400, (b) determining whether the focal point of a subject projected on the camera sensor 510 is wrong, (c) determining a condition/correctness of the focal point while changing the strength of the voltage supplied to the lens transformer 400, and (d) maintaining the supplied voltage if the focal point is determined to be correct.

In this case, the step (c) include the steps of (c1) supplying a voltage higher (or lower) than the previously supplied voltage, and then determining the condition of the focal point if the focal point is wrong; (c2) supplying a voltage higher (or lower) than the previously supplied voltage, and determining the condition of the focal point if the focal point is better; and (c3) supplying a voltage higher (or lower) than the previously supplied voltage, and determining the condition of the focal point if the focal point is not better.

The above-mentioned series of controlling process is carried out at a half shutter mode in a state that the shutter of the camera is pressed halfway down. Hereinafter, through the above-mentioned steps, the method for controlling the camera module 10 in accordance with the present invention is described in more detail referring to FIG. 6A to FIG. 7.

FIG. 6A illustrates a cross-sectional view showing the initial state when the power is not supplied to the camera module 10. Referring to FIG. 6A, in the initial state, the lens 200 is at an initial location, which is a predetermined distance from the camera sensor 510, and the spring 300 maintains a horizontal state without change. Since power (e.g., from a power source 430) is not supplied to the lens transformer 400 at this time, the attractive force or the repulsive force by magnetic force does not exist between the first member 410 and the second member 420. Although an example illustrated in FIG. 6A shows the first member 410 and the second member 420 that are spaced apart only slightly in the initial state, the invention is not limited to this, and the first member 410 and the second member 420 may be configured, for example, in a structure wherein one of the first member 410 and the second member 420 is slightly inserted into the other one.

Figure 7:
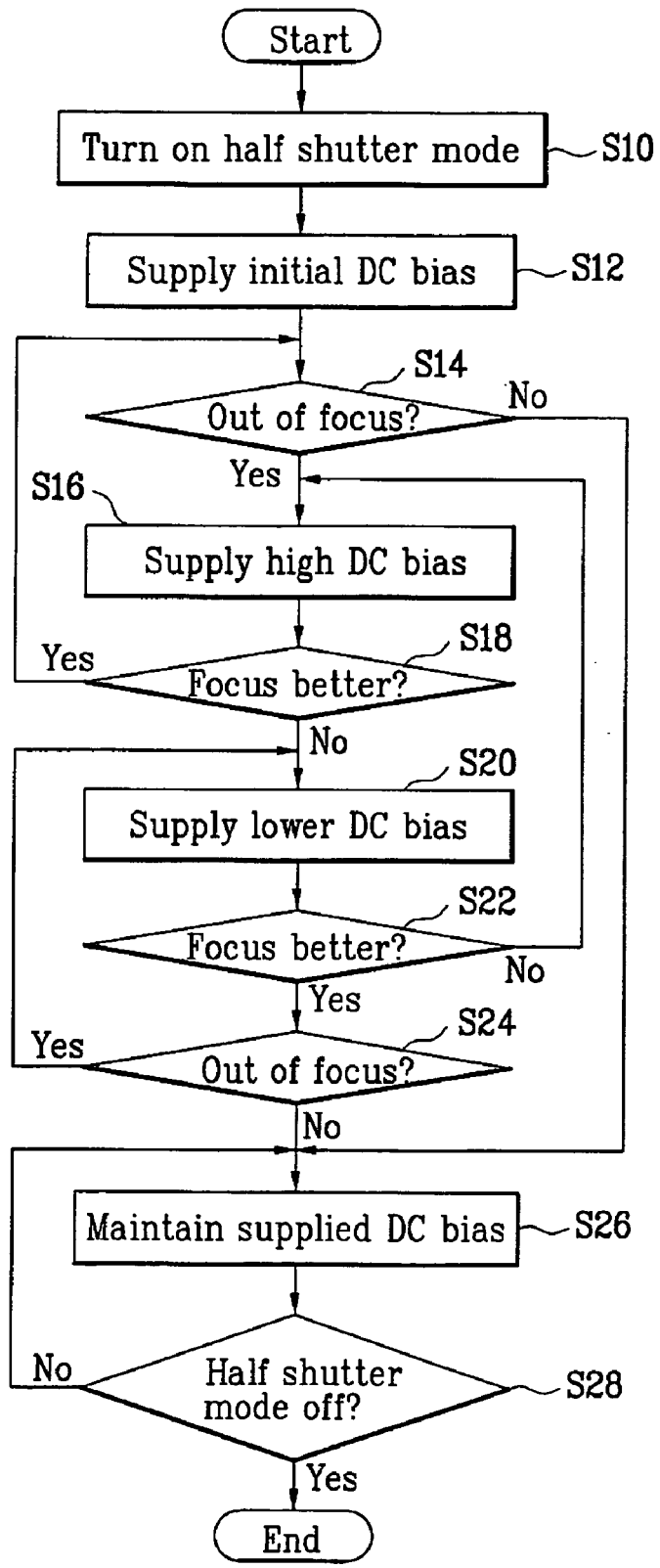
FIG. 7 illustrates a flow chart showing an embodiment of a method for controlling a camera module in accordance with present invention.

In the initial state discussed above, if the user presses the shutter (e.g., halfway), the half shutter mode is operated as illustrated in FIG. 7. In the half shutter mode, the controller 40 automatically controls the focal point by controlling the size of the voltage supplied to the lens transformer 400 and changing the location of the lens 200.

More specifically, when the half shutter mode is operated (S10), the controller 40 applies the initial DC bias to the lens transformer 400, for example, to the first member 410 (S12). Then, the attractive force or the repulsive force acts between the first member 410 and the second member 420, and the lens 200 is descended or ascended accordingly. For instance, FIG.

6B illustrates an example showing that the attractive force or the repulsive force acts between the first member 410 and the second member 420, and consequently the lens 200 is descended.

When the initial voltage is supplied and the lens 200 is moved, the distance between the lens 200 and the camera sensor 510 is changed, and therefore the focal point is also changed. In this state, the controller 40 determined whether the current focal point is wrong (S14). If step S14 determines that the focal point is right ("No" at step S14), the controller 40 maintains the initial voltage supplied to the lens transformer 400 (S26). Then the controller 40 determines whether the half shutter mode is off (S28). If not, (i.e., if the half shutter mode is on), the process returns to step S26 whereby the initial voltage is maintained.

On the other hand, if the half shutter mode is off because the user completely presses the shutter for taking a picture, or a hand of the user is taken off form the shutter, the controller 40 finishes the process for automatically controlling the focal point. Then the lens 200 is restored from the moved location (e.g., in FIG. 6B) to the initial location of FIG. 6A by the restoring force of the spring 300.

On the other hand, when the half shutter mode is started and the focal point is still wrong after the initial voltage is supplied (steps S10, S12 and S14), the controller 40 supplies a voltage higher than the initial voltage to the lens transformer 400 (S16). Then, the strength of the attractive force or the repulsive force between the first member 410 and the second member 420 is increased. Therefore, the second member 420 together with the lens 200 is spaced apart further from the initial location.

After the high voltage is supplied to the lens transformer 400 at step S16, the controller 40 determines whether the focal point is better (S18). If it is determined at step S18 that the focal point is better, steps S14-S18 may be repeated as needed, whereby the controller 40 determines whether the focal point is wrong, and if the focal point is still wrong, a higher voltage is supplied to the lens transformer 400. By repeating this process, the focal point becomes better and in focus at the end. Once the focus is made, the controller 40 maintains the voltage supplied to the lens transformer 400 (S26) and ends the process for automatically controlling the focal point when the half shutter mode is released (S28).

However, when the high voltage is supplied and it is determined at step S18 that the focal point became worse, the controller 40 supplies a lower voltage to the lens transformer 400 (S20). As mentioned above, when the lower voltage is supplied to the lens transformer 400, the lens 200 moves to or towards the initial location because the strength of the attractive force or the repulsive force acting between the first member 410 and the second member 420 becomes weak.

After the low voltage is supplied to the lens transformer 400 at step S20, the controller 40 determines whether the focal point is better (S22). If the focal point is not better at step S22, it is because a too low voltage is supplied. Therefore, in this case, a little higher voltage is supplied to the lens transformer 400 (S16) and then the process discussed above is repeated.

On the other hand, if the focal point became better after the low voltage is supplied at step S22, the controller 40 determines at step S24 whether the focal point is still wrong. If so, a lower voltage is supplied to the lens transformer 400 (S20) and the subsequent steps are repeated. By repeating the process, the focal point is placed in focus (S24) as the voltage supplied to the lens transformer 400 is lowered gradually by increments. Then, as above-mentioned, the process for automatically controlling the focal point is finished when the voltage supplied to the lens transformer 400 is maintained and the half shutter mode is turned off (e.g., by the release of the shutter) (S26 and S28).

According to the invention, the controller 40 not only changes the location of the lens 200 by controlling the size (level) of the voltage applied to the lens transformer 400, but also changes a moving direction of the lens 200 by changing the direction/polarity of the voltage supplied to the lens transformer 400.

The camera module in accordance with the present invention as discussed above has a structure that automatically controls the focal point by controlling the direction/polarity and the size of the voltage supplied to the electromagnet moving the optical lens. Therefore, the camera module in accordance with the present invention uses mechanical parts such as a gear assembly and a motor, and has a simple structure contrary to a conventional camera module with a complex structure.

Accordingly, contrary to the conventional camera module, the camera module of small size is provided and readily applied to the mobile communication terminal or other devices. In addition to this, noise is not generated when the lens for controlling the focal point is moved due to the compact structure of the camera module.

In the camera module in accordance with the present invention, the lens is provided in the housing so as to be elastically hanged by the spring. Accordingly, the lens is automatically restored to its initial location without any input of an external energy after the focal point is controlled. Therefore, energy is saved significantly.

In the camera module in accordance with the present invention, one of the first member and the second member of the lens transformer is inserted into the other one. As a result, the length of the camera module is shortened or reduced greatly.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A camera module for a mobile communication terminal, comprising:
   a camera housing;
   a lens provided in the camera housing;
   means for elastically supporting the lens in the camera housing; and
   a lens transformer including a first member supported by the camera housing and a second member supporting the lens,
   the lens transformer configured to move the lens together with the second member by generating an attractive force or repulsive force when power is supplied.

2. The camera module of claim 1, wherein the camera housing comprises:
   a first housing hanging the means for elastically supporting the lens in the camera housing ; and
   a second housing supporting the first member, and being separated from the first housing.

3. The camera module of claim 1, wherein the camera housing comprises a ridge protruded along an inner circumferential surface thereof for supporting a lower end of the first member.

4. The camera module of claim 1, further comprising:
   an image processor provided at the camera housing for receiving and processing light passed through the lens.

5. The camera module of claim 4, wherein the image processor comprises:
   a camera sensor provided in the camera housing, and receiving the light passed through the lens and converting the light into image data; and
   a digital signal processor coupled with the camera housing and converting the image data from the camera sensor into a digital signal.

6. The camera module of claim 4, wherein the camera housing comprises:
   a first space for receiving the first member;
   a second space provided under the first space for receiving at least a part of the image processor; and
   a ridge protruded along an inner circumferential surface of the camera housing, dividing a certain space of the camera housing into the first space and the second space, and supporting a lower end of the first member.

7. The camera module of claim 1, wherein the means for elastically supporting the lens in the camera housing comprises:
   an outer circumferential portion coupled with an inner circumferential surface of the camera housing; and
   an inner circumferential portion coupled with at least one of the lens and the first member.

8. The camera module of claim 1, wherein the means for elastically supporting the lens in the camera housing, has a flat form.

9. The camera module of claim 1, wherein the means for elastically supporting the lens in the camera housing has a folded form along a radius direction of the means for elastically supporting the lens in the camera housing.

10. The camera module of claim 1, wherein the means for elastically supporting the lens in the camera housing has a ring configuration.

11. The camera module of claim 1, wherein the second member is formed in a ring form, and the lens is fixed on an inner circumferential surface of the second member.

12. The camera module of claim 1, wherein one of the first member and the second member comprises an electromagnet.

13. The camera module of claim 1, wherein the first member and the second member have different diameters.

14. The camera module of claim 13, wherein one of the first and second members is inserted into the other one when an attractive force acts between the first member and the second member.

15. The camera module of claim 1, wherein the camera housing comprises:
   a first housing hanging the means for elastically supporting the lens in the camera housing;
   a second housing receiving the second member and a part of an image processor; and
   a third housing supported on the second housing and supporting the first housing.

16. A mobile communication terminals comprising:
   a terminal housing having a signal input/output system, a display, a memory, a controller, and a mobile communication signal processor;
   a battery pack detachably mounted at the terminal housing; and
   a camera module including a camera housing mounted at the terminal housing, a lens provided in the camera housing, a means for elastically supporting the lens in the camera housing, and a lens transformer configured to move the lens by generating an attractive force or repulsive force when power is supplied.

17. The mobile communication terminal of claim 16, wherein the camera module further comprises an image processor including:
   a camera sensor provided in the camera housing for converting lights passed through the lens into image data; and
   a digital signal processor coupled with the camera housing for converting the image data received from the camera sensor into a digital signal.

18. The mobile communication terminal of claim 16, wherein the lens transformer comprises:
   a first member supported by the camera housing; and
   a second member mounted to be geared with the lens and moving together with the lens when the power is supplied to the lens transformer and the attractive force or repulsive force is generated.

19. The mobile communication terminal of claim 18, wherein one of the first member and the second member comprises an electromagnet, and the other one of the first and second members comprises a magnetic body, a permanent magnet or an electromagnet.

20. The mobile communication terminal of claim 18, wherein the first member and the second member have different diameters, such that at least a part of one of the first member and the second member is inserted into the other one when the attractive force is generated between the first member and the second member.

21. The mobile communication terminal of claim 18, wherein the camera housing comprises:
   a first space for receiving the first member;
   a second space provided under the first space for receiving at least a part of an image processor; and
   a ridge protruded along an inner circumferential surface of the camera housing, dividing a certain space of the camera housing into the first space and the second space, and supporting a lower end of the first member.

22. The mobile communication terminal of claim 18, wherein the means for elastically supporting the lens in the camera housing comprises;
   an outer circumferential portion coupled with an inner circumferential portion of the camera housing; and
   an inner circumferential portion coupled with at least one of the lens and the first member.

23. A method for controlling a camera module for a mobile communication terminal, comprising steps of:
   (a) supplying an initial voltage to a lens transformer and thereby moving a lens of the camera module, the camera module including means for elastically supporting the lens in the camera housing;
   (b) determining whether a focal point of a subject projected on a camera sensor of the camera module is wrong after the lens is moved in response to the initial voltage; and
   (c) automatically and continuously adjusting a strength of a voltage supplied to the lens transformer until a correct focal point is established.

24. The method of claim 23, wherein the step (a) is performed only in a half shutter mode.

25. The method of claim 23, wherein the voltage currently supplied to the lens transformer is maintained if the correct focal point is obtained.

26. The method of claim 23, wherein the step (c) comprises the step of:
   incrementally increasing or decreasing the voltage supplied to the lens transformer after checking a current focal point condition each time the voltage supplied to the lens transformer is changed.

27. The method of claim 26, wherein the increasing/decreasing step is an increase step and the voltage currently supplied to the lens transformer is maintained if the correct focal point is obtained.

28. A method of assembling a camera module usable in a communication device, comprising:

providing a camera housing including first, second and third housing parts;

inserting a portion of a transformer within an upper portion of the second housing part;

inserting a portion of the third housing part within the upper portion of the second housing part;

suspending a lens within the first housing part placed on the third housing part with a means for elastically supporting the lens in the camera housing; and inserting a potion of an image processor within a lower portion of the second housing part.

29. The method of claim 28, wherein in the step of inserting the transformer, the inserted position of the transformer is fixed by a ridge protruding on an inner surface of the second housing part.

30. A controllable camera module for a mobile communication terminal, comprising:

means for supplying an initial voltage to a lens transformer and thereby moving a lens of the camera module;

means for elastically supporting the lens in a camera housing;

means for determining whether a focal point of a subject projected on a camera sensor of the camera module is wrong after the lens is moved in response to the initial voltage; and means for automatically and continuously adjusting a strength of a voltage supplied to the lens transformer until a correct focal point is established.

31. A controllable camera module for a mobile communication terminal, comprising:

a camera housing;

a lens provided in the camera housing;

means for elastically supporting the lens in the camera housing; and means for moving the lens by generating an attractive force or repulsive force when power is supplied.

* * * * *